(12) United States Patent
Mangin

(10) Patent No.: US 12,244,508 B2
(45) Date of Patent: Mar. 4, 2025

(54) METHOD IMPLEMENTED IN PACKET-SWITCHED NETWORK FOR SCHEDULING TRANSMISSION OF ETHERNET FRAME

(71) Applicant: MITSUBISHI ELECTRIC CORPORATION, Tokyo (JP)

(72) Inventor: Christophe Mangin, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/283,405

(22) PCT Filed: Dec. 8, 2021

(86) PCT No.: PCT/JP2021/046163
§ 371 (c)(1),
(2) Date: Sep. 21, 2023

(87) PCT Pub. No.: WO2022/254759
PCT Pub. Date: Dec. 8, 2022

(65) Prior Publication Data
US 2024/0171518 A1 May 23, 2024

(30) Foreign Application Priority Data
May 31, 2021 (EP) ..................... 21305724

(51) Int. Cl.
*H04L 47/28* (2022.01)
*H04L 47/24* (2022.01)
*H04L 47/6275* (2022.01)

(52) U.S. Cl.
CPC .............. *H04L 47/28* (2013.01); *H04L 47/24* (2013.01); *H04L 47/6275* (2013.01)

(58) Field of Classification Search
CPC ...... H04L 47/28; H04L 47/24; H04L 47/6275
(Continued)

(56) References Cited

U.S. PATENT DOCUMENTS

2008/0298380 A1 12/2008 Rittmeyer et al.
2014/0286349 A1* 9/2014 Kitada ................. H04L 47/527
370/412

(Continued)

OTHER PUBLICATIONS

International Search Report for PCT/JP2021/046163 (PCT/ISA/210) mailed on Feb. 1, 2022.
(Continued)

*Primary Examiner* — Karen C Tang
(74) *Attorney, Agent, or Firm* — Birch, Stewart, Kolasch & Birch, LLP

(57) ABSTRACT

The invention relates to a method implemented in a packet-switched network for scheduling transmission of Ethernet frames, where a time of a next transmission of a future time-critical traffic frame (Express frame), among several time-critical traffic frames to transmit, is determined on the basis of respective priority levels of the time-critical traffic frames. The determination of this next transmission time allows a fair timing of transmission of such time-critical traffic frames which might belong to different streams. It makes possible also to transmit, before the aforesaid next transmission time, preemptable frames of non-time-critical traffic.

14 Claims, 7 Drawing Sheets

(58) Field of Classification Search
USPC .......................................................... 709/231
See application file for complete search history.

(56) References Cited

U.S. PATENT DOCUMENTS

| | | |
|---|---|---|
| 2018/0237039 A1 | 8/2018 | Mong et al. |
| 2019/0199641 A1 | 6/2019 | Lo Bello et al. |
| 2022/0166677 A1* | 5/2022 | Jabbar ..................... H04L 67/62 |
| 2022/0166720 A1* | 5/2022 | Jabbar ..................... H04L 47/28 |

OTHER PUBLICATIONS

Written Opinion of the International Searching Authority for PCT/JP2021/046163 (PCT/ISA/237) mailed on Feb. 1, 2022.
Japanese Office Action for Japanese Application No. 2023-568760, dated Aug. 6, 2024, with English translation.

* cited by examiner

METHOD IMPLEMENTED IN PACKET-SWITCHED NETWORK FOR SCHEDULING TRANSMISSION OF ETHERNET FRAME

TECHNICAL FIELD

The present invention relates to the management of communication of Ethernet frames.

BACKGROUND ART

Packet-switched networks are increasingly used for industrial control application thanks to the introduction of Layer-2 features that allow the transport of control data that cannot suffer latency and transfer delay variation.

For instance, low-latency sampling data, (closed loop) control and image streaming (e.g. for process control) have very stringent latency requirements. Image streaming and associated processing as a part of a control loop has greater requirements than best effort transport could provide in a converged network.

In parallel, best effort stream is not time-critical, but provides a constant source of interference for time-critical streams.

Solutions have been progressively developed, in particular for the adaptation of switched Ethernet to the requirements of industrial field busses (such as for example EtherCAT, Ethernet Powerlink, TCnet, PROFINET, etc.).

All these solutions rely on specific proprietary additions to the standard Ethernet protocol that provide support for time-critical streams which transmission requires controlled scheduling.

The common scheme used by these adaptations is based on an organization of the transmission multiplex in time windows, each window being reserved for a specific stream type. The number and repetition frequencies of the time windows is determined according to the requirements of the applications.

Considering that the (industrial control) applications generating scheduled stream have a periodic activity, the transmission multiplex ends up being organized in periodic cycles, each cycle containing a series of time windows reserved for scheduled (low-latency) streams, the rest of the transmission opportunities is devoted to non-scheduled streams. This communication scheme is shown in FIG. 1, illustrating the cyclic organization of a transmission multiplex.

However, in some environments, some other control applications have less stringent latency or jitter requirements: embedded automotive control networks are among these applications. In these environments, the extra network engineering required by the computation of the schedules and the synchronization of traffic sources with the network can be avoided provided the chosen traffic management method guarantees limited jitter, bounded latency and zero-packet-loss to the critical control streams.

Traffic shaping according to a predefined data rate reserved throughout the network and negotiated by the source with the network is a technique that is well adapted to achieve these performance goals. It provides means to guaranty transmission delay bounds and fairness between the scheduled streams.

To further reduce potential sources of latency due to the interference between scheduled and non-scheduled streams, pre-emption mechanisms are introduced. Preemption intervenes at the transition between a non-scheduled stream transmission opportunity and a scheduled stream transmission opportunity, as shown in FIG. 2 illustrating a scheduled frame transmission guaranteed by non-scheduled frame fragmentation. In particular, upon such a transition, the beginning of a scheduled stream transmission opportunity can overlap the end of the transmission opportunity of a non-scheduled stream. In such a case, the frame of the scheduled stream cannot be transmitted until the current transmission of a frame of a non-scheduled stream ends.

By pre-empting the transmission opportunity of the residual part of the frame of the non-scheduled frame, it is possible to avoid additional delay to be suffered by the scheduled stream. To facilitate the pre-emption operation, frames of the non-scheduled stream can be fragmented causing the transmission of the remaining fragment(s) to be delayed until the transmission opportunities of the scheduled streams are complete.

In an effort to provide efficient interworking between scheduled and non-scheduled streams, two standards have been developed:

802.1Qbv: defining a scheduling scheme relying on the reservation of time windows for different Traffic Classes;

802.3br (for the MAC part) and 802.1Qbu (for the bridge management part) defining a pre-emption scheme that specifies the fragmentation mechanisms applied to so called "preemptable" frames upon the concurrent transmission of so called "express" frames typically belonging to scheduled streams.

802.1Qbv is based on a periodic calendar table, which entries define the opening and closing times of the time windows reserved for the transmission of the streams of different Traffic Classes. Scheduled and non-scheduled Streams belong to theses Traffic Classes. Due to the cyclic nature of the calendar table used by 802.1Qbv, these standards provide an adapted framework for the transport of periodic scheduled streams with minimal latency, a similar service to those provided by the industrial standards cited above.

As for the preemption operation, two MAC service interfaces, namely preemptable MAC (pMAC) service interface and express MAC (eMAC) service interface are specified to implement one-level frame preemption in bridge's or end-station's transmission ports as illustrated in FIG. 3, showing a preemption protocol stack. The interspersing of express traffic with preemptable traffic is achieved by the MAC Merge Sublayer linking an express Media Access Control (eMAC) and a preemptable MAC (pMAC) to a common Reconciliation Sublayer (RS) service.

For traffic classes that are identified as preemptable, frames that are selected for transmission are transmitted using the pMAC service instance, and for traffic classes that are identified as express, frames that are selected for transmission are transmitted using the eMAC service instance.

Preemption can occur only between an express and a preemptable frame, with the express frame having higher priority than the preemptable frame. When preemption occurs, the transmission of the preempted frame is resumed only when the express frames have been completely transmitted. A preemptable frame can be preempted multiple times. An express frame cannot be preempted by any other frames, whereas a preemptable frame can be preempted by any express frames.

The MAC Merge sublayer provides one command to force the preemption process when no express frame is transmitted: the MM_CTL.request primitive that defines a request from a MAC Client to the MAC Merge sublayer to hold or release transmission of preemptable traffic. Setting the "hold" command causes preemption when the conditions allow preemption and prevents starting transmission of pMAC frames until the command is set to "release". In the latter case, the MAC Merge sublayer transmits packets from the pMAC when the eMAC does not have a packet to transmit.

When preempted, frames are split into fragments reformatted by the MAC Merge sublayer so as to be passed to the Ethernet's physical layer as complete frames. These complete frames transmit the split payload and have different formats so that the first, intermediate and last fragments of the preempted frame can be identified. Ports supporting frame preemption transmit frames with a Start Frame Delimiter (SFD) byte replaced by either:

SMD-E for express frames,
SMD-Sx for the start fragment of the preemptable frame or
SMD-Cx for the continuation fragment of the preemptable frame.

FIG. 4 illustrates the corresponding frames and fragments formats.

Continuation fragments have a 1-byte shorter preamble giving place to the FCnt byte, the fragment counter. Intermediate and Last fragments end with a partial 4-byte CRC checksum (mCRC). The last fragment is terminated by the whole frame's FCS, as in express frames.

The minimum non-final fragment size (excluding the FCS) can be fixed by configuration and remains compatible with the Ethernet minimum frame size requirement of 64 bytes. It can take the values $64 \times (1+n) - 4$, with $0 \le n \le 3$. Fragmentation cannot be performed if it were to produce a fragment smaller than the minimum non-final fragment size. This results in frames shorter than $64 \times 2 \times (1+n) - 4$ bytes not being fragmentable.

In a switch that does not support preemption, a high-priority frame can be delayed by at most 123.36 μs on a 100 Mbps port, i.e. the duration of a maximum size frame at 100 Mbps. When frame preemption is implemented, the maximum Express frame latency due to Preemptable frame interference is reduced to 10.16 μs.

This residual delay can potentially have a negative impact on the performance, depending on the Express Stream timing requirements.

In order to mitigate the impact of transmission interference on higher-priority frames by lower-priority frames, a so-called guard-band can be catered for before the transmission of a higher-priority frame starts.

When preemption is implemented, the duration of such guard-band can be reduced to a minimum corresponding to the maximum size of a non-fragmentable frame or fragment, e.g. 123 bytes, when the minimum non-final fragment size is 60 bytes. In this case, the preemption control command has to be set to "hold" a time corresponding to that guard-band before the Express frame transmission is scheduled.

FIG. 5 illustrates such a guard-band provision by preemption control with the HOLD command, with a split of the preemptable frame into two fragments, while the transmission of the express frame is scheduled on time.

In the framework of IEEE TSN standards, this combination of preemption and provision of a guard-band is only used when Express traffics transmission is handled as per the 802.1Qbv standard that explicitly defines time windows reserved for the transmission of these traffics. Guard-band cannot be inserted before the transmission of individual frames.

The only IEEE TSN standard that allows the implementation of guard-bands to guarantee the on-time transmission of higher-priority frames is 802.1Qbv since the time windows it bases its transmission selection mechanism on are defined according to a time reference that allows the in-time insertion of the guard band. In such a configuration, the guard-band can only be provisioned to protect cyclic traffics synchronised to a common clock and which cycles are multiple of a common base cycle.

However, if mixing communications with stringent delay constraints but with individual independent cycles, or more generally different traffic shape not synchronous of a common cycle, is required, the IEEE standard suite does not provide any solution.

It is sought thus, in the context of scheduling transmission of Ethernet frames in a packet-switched network, to determine a fair next time of transmission of time-critical traffic frames respecting, inter alia, the priority levels of the different time-critical traffic streams, as a general problem to solve, and optionally in an embodiment where possible non-time-critical traffic frames are to be transmitted, to determine whether such a transmission of non-time-critical traffic frames (or frame fragment at least) is possible or not, in view of the next time of transmission of a time-critical traffic frame.

SUMMARY OF INVENTION

The present invention aims to improve this situation. It is proposed to that end a method comprising:
a) identifying, among the Ethernet frames to transmit, time-critical traffic frames, and respective priority levels of said time-critical traffic frames,
b) obtaining data of a transmission time (noted TCiNextTx in the appended figures) of each time-critical traffic frame and of a transmission duration (noted FrameDur(i)) of each time-critical traffic frame,
c) comparing the transmission times of the respective time-critical traffic frames so as to determine a list of said transmission times by increasing order,
d) for a first frame having a first transmission time at top of the list, determining a result of addition of said first transmission time and a transmission duration of said first frame,
e) determining whether at least one second transmission time in said list is lower than said result of addition, and:
   if not, a next transmission time of a time-critical traffic frame is determined as the first transmission time,
   if yes, determining whether a priority of a second frame having said second transmission time in the list, is higher than a priority of the first frame, and
   if not, a next transmission time of a time-critical traffic frame is determined as the first transmission time, and
   if yes, removing the first transmission time from the list and repeating d) and e) with a new transmission time following the first transmission time in the list, said new transmission time becoming the first transmission time for the implementation of the repetition of d) and e),
f) scheduling the next transmission time of the time-critical traffic frame having a transmission time which remains the first transmission time of the list.

In an embodiment, the aforesaid transmission duration data of each time-critical traffic frame are obtained from a frame descriptor field provided in a data structure of said time-critical traffic frame.

In practice, the length of the frame is known from that field and its transmission duration can thus be determined upon that length and upon a link speed (usually known at any egress port of a transmitter device).

In an embodiment, the aforesaid priority level of each time-critical traffic frame is defined according to a traffic class ("TCi" in the notation TCiNextTx) to which said time-critical traffic frame pertains.

For example, a stream context, defining a class TCi, can be derived typically from a priority code point in the VLAN-Tag of the Ethernet frame. This traffic class parameter TCi defines a "contractual" time at which a frame related to that class parameter TCi is to be transmitted. The next transmission time of such a frame of that traffic class TCi is denoted TCiNextTx hereafter and in the appended drawings.

For example, in some embodiments, successive time-critical traffic frames are to be transmitted at respective successive transmission times separated by a same time period (as explained above relatively to the standard 802.1Qbv based on a periodic calendar table). However, other time-critical traffic frames (some signalling frames for example) may pertain to streams which are not scheduled to be periodic and must be transmitted thus at particular times which are not necessarily related to a cycle.

Therefore, it is important then to determine, on the basis of the traffic classes TCi, TCj, etc. to which the frames belong, their respective priority levels and, thanks to the method described above, the fairest next transmission time of a time-critical traffic frame to transmit.

In an embodiment, the time-critical traffic frames can be, before their transmissions, stacked in FIFO queues depending respectively on the traffic classes to which the time-critical traffic frames pertain, each queue corresponding to one traffic class.

As shown in FIG. 6 further commented below, it is possible to assign moreover several FIFO queues to one and same traffic class.

In an embodiment, the transmission times (TCiNextTx) of the time-critical traffic frames can be defined relatively to a current time given by a common clock of the packet-switched network.

Indeed, since the traffic class period is known and the common network time is known, it is thus possible to determine the transmission times of each of the time-critical traffic frames finally.

In an embodiment where the time-critical traffic frames are to be distinguished from non-time-critical traffic frames, identified as preemptable traffic frames to be transmitted whenever no time-critical traffic frame is to be transmitted, the aforesaid next transmission time of a time-critical traffic frame determined in f) defines, relatively to a current time, whether at least one minimum sized fragment of a non-time-critical traffic frame can be transmitted or not.

In this embodiment, the implementation of the method until f) is launched each time when a time-critical traffic frame is transmitted, so as to define the next transmission time of a new time-critical traffic frame.

This embodiment makes it possible to determine soon enough if at least a fragment of a non-time-critical traffic frame can be transmitted, depending on the remaining time until the next transmission time of a time-critical traffic frame.

The aforesaid one minimum sized fragment of a non-time-critical traffic frame corresponds to a duration of a guard-band interval (as presented above when referring to FIG. 5), and if the next transmission time is determined in f) to occur after a beginning of said guard-band interval, then any transmission of non-time-critical traffic is deferred, and otherwise, at least one fragment of a non-time-critical traffic frame is transmitted.

In this embodiment for example, an offset due to command latency can be added to a duration of transmission of one minimum sized fragment of a non-time-critical traffic frame in order to determine the appropriate duration of the guard-band interval.

In such an embodiment, it is possible to define a transmission command set to a "hold" status before the beginning of said guard-band interval (as presented in FIG. 5) so as to prevent from any transmission of a non-time-critical traffic frame when said next transmission time of a time-critical traffic frame occurs.

Here, the wording "before the beginning of the guard-band interval" means "just before" the beginning of the guard-band interval or at the beginning of the guard-band interval.

Moreover, this transmission command can be set then to a "release" status (just) after (or at) the beginning of transmission of said time-critical traffic frame.

The invention aims also at a computer program comprising instructions which, when the program is executed by a processing circuit, cause the processing circuit to carry out the method above. It aims also at a computer-readable storage medium comprising instructions which, when executed by a the processing circuit, cause the processing circuit to carry out the method.

It aims also at an equipment comprising:
a processing circuit configured to implement the method above, and
a communication interface configured to be connected to the packet-switched network and to be piloted by the processing circuit in view to transmit Ethernet frames, when a transmission of said Ethernet frames is scheduled by the processing circuit.

More details and advantages of the invention will appear from the following specification of detailed possible and optional embodiments, and also from the appended drawings.

DESCRIPTION OF EMBODIMENTS

Figure 1:
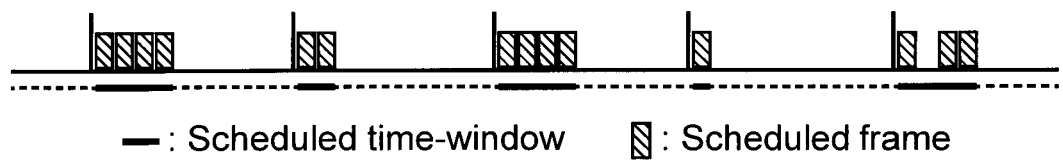
FIG. 1 illustrates a cyclic organization of a transmission multiplex.
Figure 2:
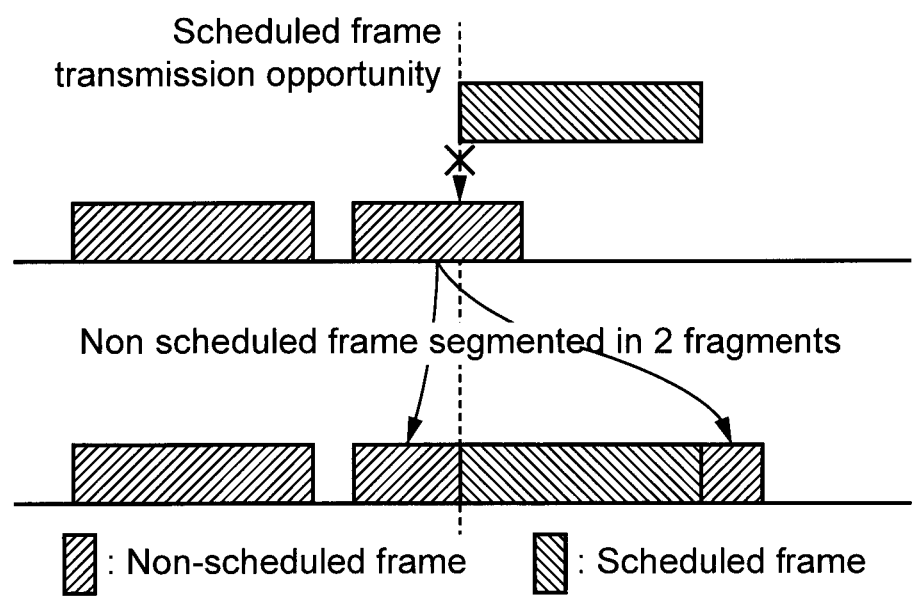
FIG. 2 illustrates a scheduled frame transmission guaranteed thanks to a non-scheduled frame fragmentation.
Figure 3:
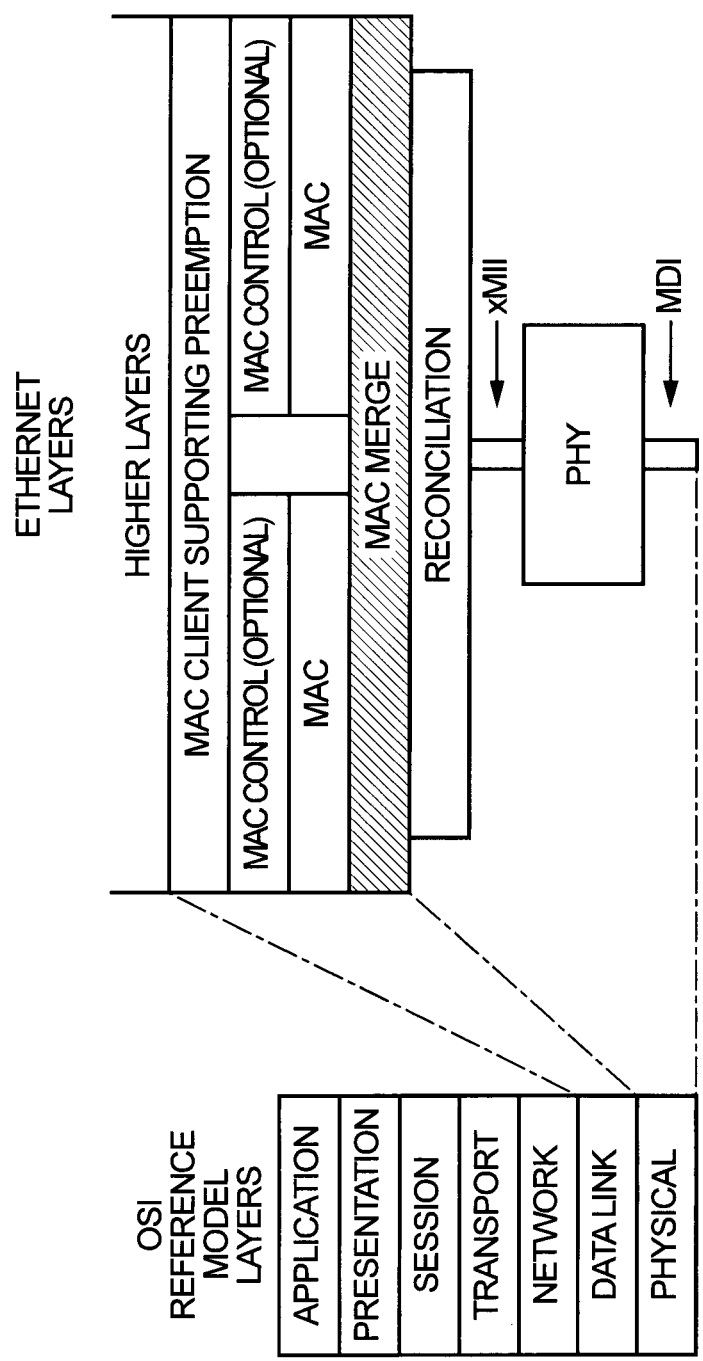
FIG. 3 illustrates an example of pre-emption protocol stack.
Figure 4:
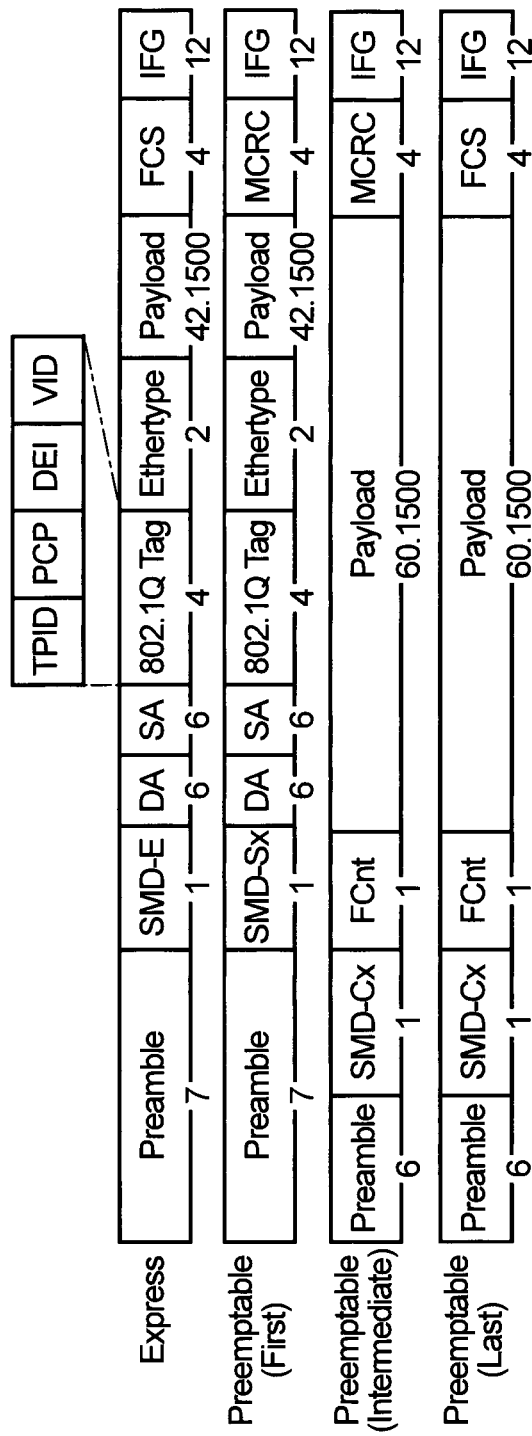
FIG. 4 shows frames and fragments formats.
Figure 5:
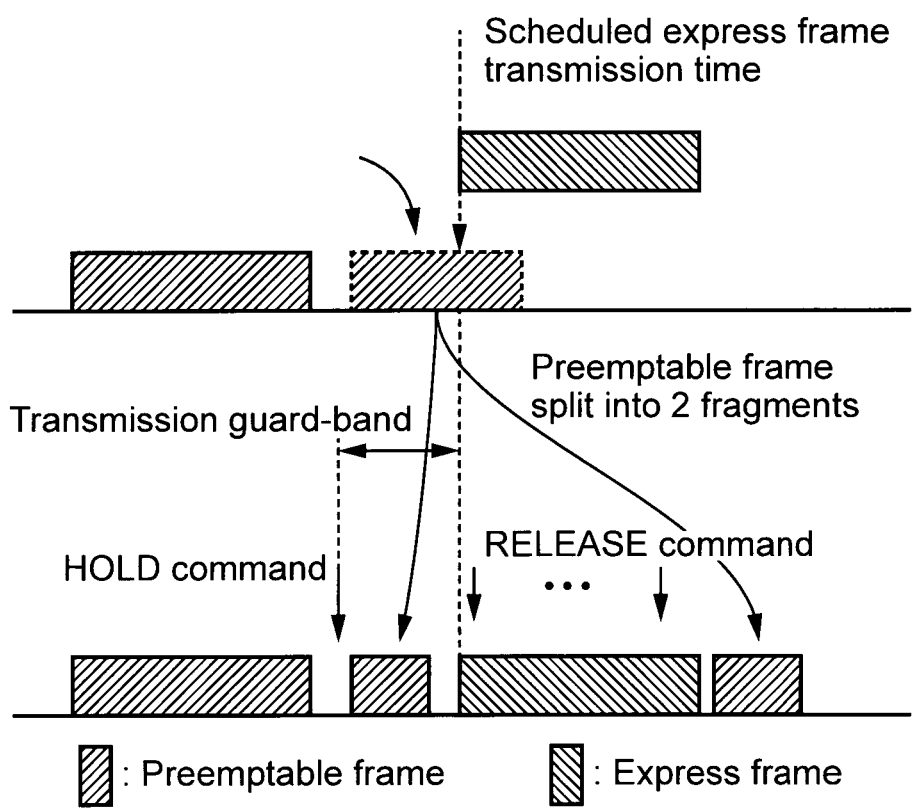
FIG. 5 illustrates a guard-band provision by pre-emption control with the HOLD command.

In the embodiment presented hereafter, it is proposed to integrate the management of the MAC Merge sublayer pre-emption control command in a generic scheduling scheme otherwise implemented for the transmission selection of individual frames or bursts of frames.

The proposed mechanism is based on the priority level of each traffic and the synchronisation to a time reference common to the frame/burst scheduling scheme.

Hereafter, "time-critical traffics" are those traffics that have stringent transmission delay and jitter constraints. The transmission time of their frames is relative to a common time reference that is shared between all nodes of a network (end-stations and bridges) to guaranty tight synchronisation between all participants of an application. To enforce the delay and jitter requirements of time-critical traffic, transmission interference with non-time-critical traffics must be avoided.

Time-critical traffics belong thus to Traffic Classes which priority levels make them considered as express traffics.

If there are several Traffic Classes associated with time-critical traffics, the transmission of frames of a Traffic Class of a priority level cannot interfere with the transmission of any frames of the Traffic Classes of higher priority level.

Time-critical traffic frames are treated therefore as express frames.

Each frame of a time-critical traffic is associated with a transmission time expressed in the same time reference as the network time. Frames of a time-critical traffic are then deemed to be transmitted when their transmission time expires.

Hereafter, "non-time-critical traffics" belong, by opposition, to Traffic Classes which priority levels make them considered as preemptable traffics and the transmission times of their frames are not necessarily related to the common network time. They are transmitted whenever no time-critical traffic is transmitted according to a transmission selection mechanism that is not necessary to detail here.

Moreover, a hold command scheduling is performed and its goal is to set the MAC merge control (MM_CTL.request primitive) command to the state HOLD at a time that guarantees that a sufficient transmission guard-band is provided before the transmission of a time-critical frame.

The setting time of this so-called "hold command" is referenced to the network time and is fixed based on the transmission time of the next time-critical frame.

The determination of the transmission time of this next time-critical frame is presented hereafter.

At a first scheduling stage, the transmission time of the next time-critical frame is determined for each Traffic Class: TCiNextTx, with i the identifier of the Traffic Class. In this parameter expression TCiNextTx, the index i also determines the priority level p(i) of the Traffic Class.

The transmission duration of each frame is available in a data structure associated with the frame (a frame descriptor). The frame duration of the frame of Traffic Class TCi candidate for transmission (i.e. which transmission time is TCiNextTx) is denoted FrameDur(i).

Frames are stored in queues before their transmission. The way these queues are organised is not necessary to detail here.

TCiNextTx is evaluated:
  each time a frame of TCi is transmitted (i.e. passed down to the MAC service layer) or,
  each time a frame of TCi is received from the upper layer.
The evaluation of TCiNextTx itself is not necessary to detail here.

When no frame of Traffic Class i is available for transmission, i.e. all queues storing frames of Traffic Class i are empty, TCiNextTx is assigned with the "null" value.

Figure 6:
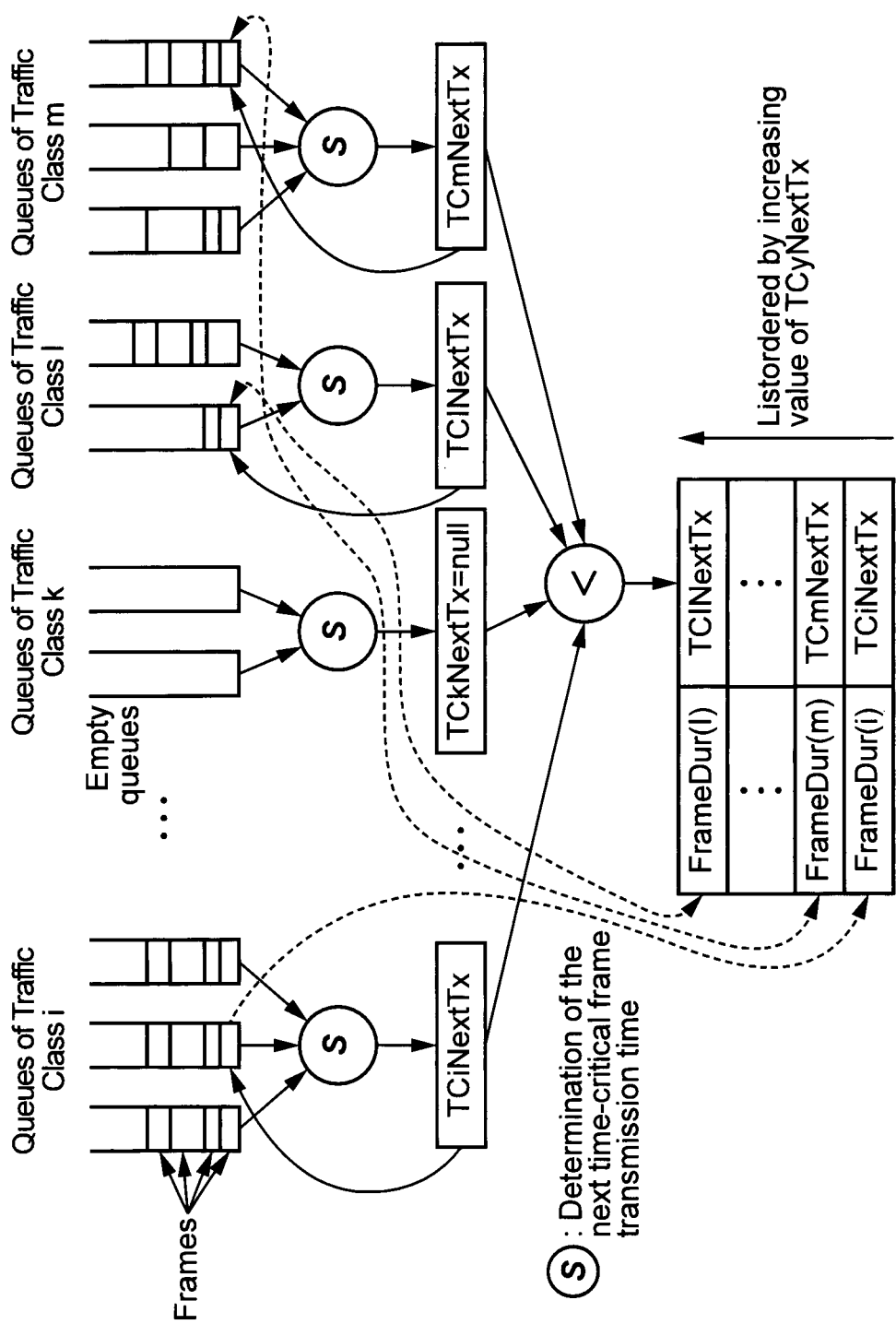
FIG. 6 illustrates an example of context for the determination of the next time-critical transmission time, and especially an input to that end.

As shown in FIG. 6, all time-critical TC's TCiNextTx of any priority level that have a non-"null" value, are compared with each other and are put in an ordered list by increasing order of their value, i.e. each element in this list is indexed by an index o such that TCiNextTx[o]≤TcjNextTx[o+1].

To each element in this list is associated the transmission duration of the frame candidate for transmission for the Traffic Class, i.e. FrameDur(i) is associated with TCiNextTx.

Figure 7:
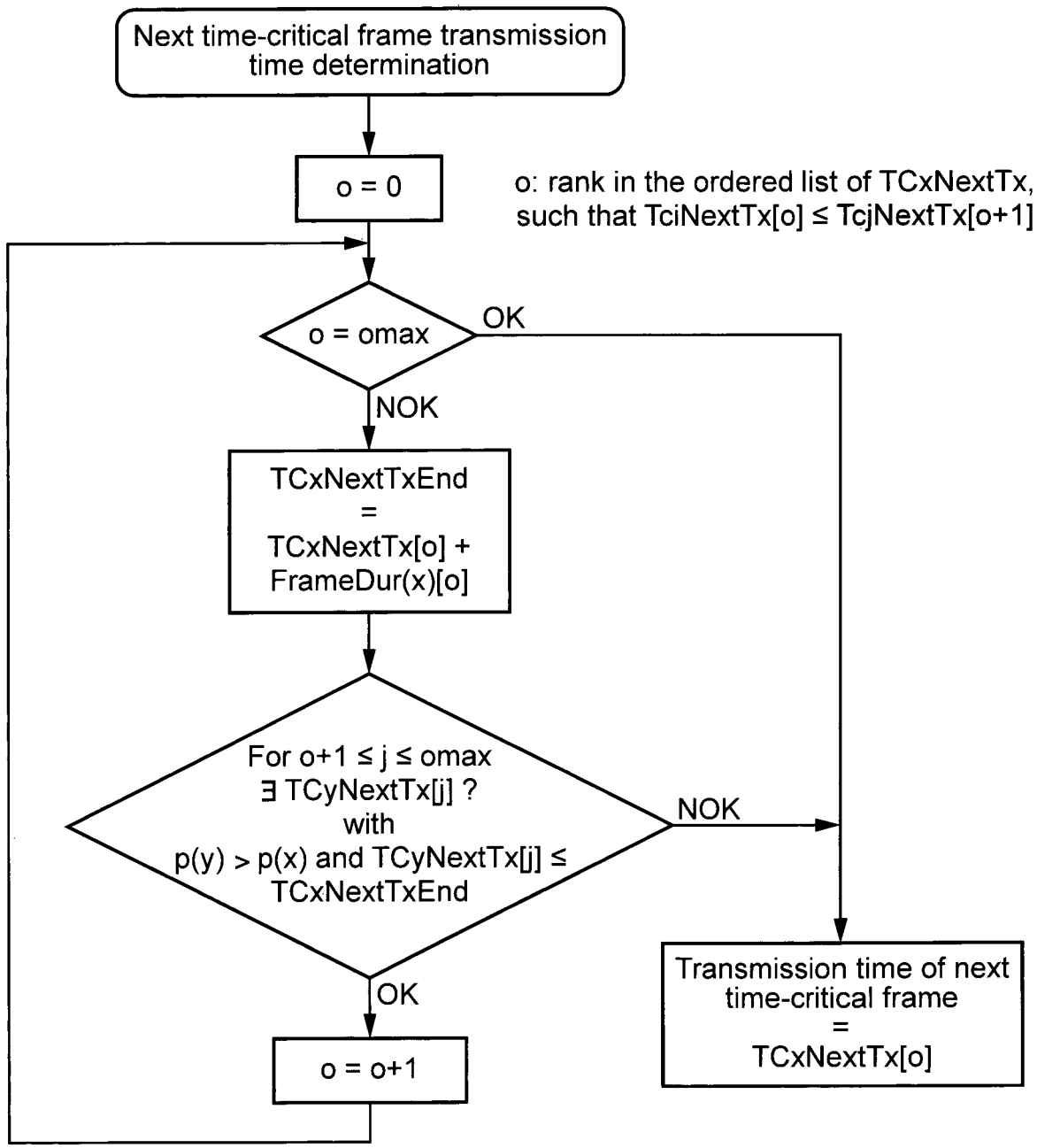
FIG. 7 is a flow chart showing some of the steps of the method presented above, in view of the determination of the next transmission time of time-critical traffic frames.

The determination of the next time-critical frame transmission time is then obtained by performing the following algorithm also illustrated in FIG. 7.

Namely, starting with the first (i.e. the smallest) TCxNextTx in the ordered list, the end of transmission time of the frame candidate for transmission of Traffic Class x (i.e. the sum of TCxNextTx and FrameDur(x)) is computed: TcxNextTxEnd. If a Traffic Class for which TCyNextTx is smaller or equals TCxNextTxEnd and its priority level p(y) is higher than p(x), then the transmission of the frame candidate for transmission of Traffic Class TCx would interfere with the transmission of a frame belonging to a Traffic Class of higher priority level.

In that case, the next time-critical frame transmission time is reiterated with the next element in the ordered list. Otherwise, TCxNextTx is selected as the transmission time of the next time-critical frame. This selection process is reiterated until the last element of the ordered list is reached.

Regarding now the MAC Merge sublayer control operation, the parameter HOLDTime is the date that, when expired (i.e. when the current time is greater or equals HOLDTime), triggers the setting of the MM_CTL.request primitive to HOLD.

HOLDTime is computed as the result of the subtraction TCxNextTx–HOLDOffset, with:
  TCxNextTx the transmission time of the frame selected as the next time-critical frame to be transmitted, as determined above, and
  HOLDOffset the duration chosen such that the MM_CTL.request primitive is set to HOLD long enough in advance to permit the completion of the transmission of a non-fragmentable preemptable frame or at least a non-fragmentable final fragment.

By doing so, the transmission guard-band reserved before the transmission of an express frame is implemented. HOLDOffset is computed from the configurable length of a non-fragmentable frame or final fragment and the bitrate of the transmission link.

Moreover, the MM_CTL.request primitive is to be set to RELEASE upon the start of transmission of an express frame.

Figure 8:
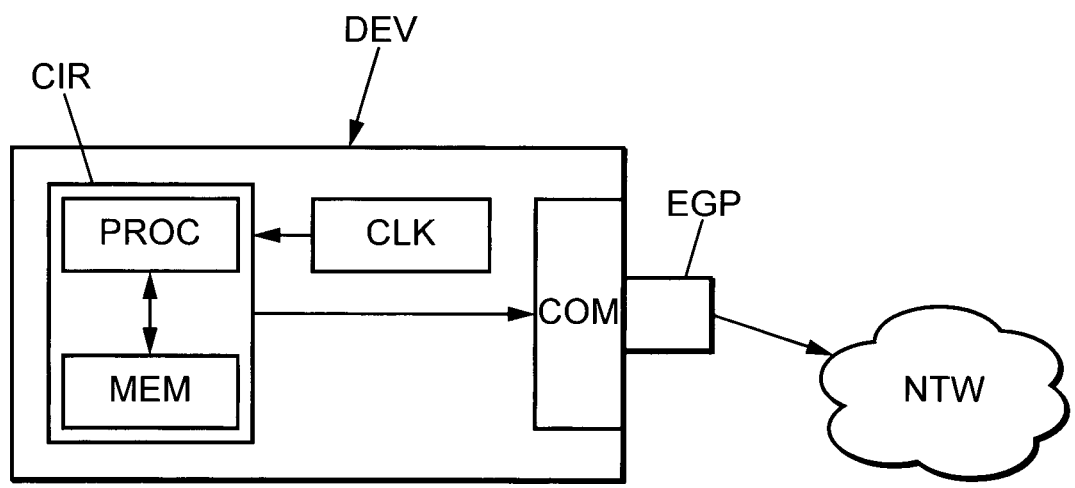
FIG. 8 shows an example of device for performing the method.

As shown on FIG. 8, a device, such as an end station, DEV can comprise, for performing the above described method, a processing circuit CIR including a processor PROC and a memory MEM storing at least instructions data of a computer program according to the present invention. The memory MEM can include furthermore a memory unit arranged as FIFO queues to store temporarily the incoming frames. The processor PROC can access to the memory MEM so as to read and execute the instructions stored in the memory. Moreover, the end station DEV further includes at least a communication interface COM having an egress port EGP, and a clock CLK so as to enable the processor PROC to operate in synchronization with a clock of the network NTW to which the interface COM is connected. The clock CLK makes it possible typically to guarantee then to use a time synchronization protocol as presented above.

The invention can thus be used in packet-switched networks supporting a mix of time-critical and non-time-critical traffics as they can be encountered in industrial automation networks.

It optimizes the design of Ethernet TSN network interfaces in industrial automation end-stations (devices) as well as the use of the transmission resource of the network.

Typically, it can be applied in embedded control networks such as industrial, automotive and aerospace networks where a mix of time-critical and non-time-critical traffics are supported.

The invention claimed is:

1. A method implemented in a packet-switched network for scheduling transmission of Ethernet frames, comprising:
   a) identifying, among the Ethernet frames to transmit, time-critical traffic frames, and respective priority levels of said time-critical traffic frames,
   b) obtaining data of a transmission time of each time-critical traffic frame and of a transmission duration of each time-critical traffic frame,
   c) comparing the transmission times of the respective time-critical traffic frames so as to determine a list of said transmission times by increasing order,
   d) for a first frame having a first transmission time at top of the list, determining a result of addition of said first transmission time and a transmission duration of said first frame,
   e) determining whether at least one second transmission time in said list is lower than said result of addition, and:
      * if not, a next transmission time of a time-critical traffic frame is determined as the first transmission time,
      * if yes, determining whether a priority of a second frame having said second transmission time in the list, is higher than a priority of the first frame, and
         ** if not, a next transmission time of a time-critical traffic frame is determined as the first transmission time, and
         ** if yes, removing the first transmission time from the list and repeating d) and e) with a new transmission time following the first transmission time in the list, said new transmission time becoming the first transmission time for the implementation of the repetition of d) and e),
   f) scheduling the next transmission time of the time-critical traffic frame having a transmission time which remains the first transmission time of the list.

2. The method according to claim 1, wherein said transmission duration data of each time-critical traffic frame are obtained from a frame descriptor field provided in a data structure of said time-critical traffic frame.

3. The method according to claim 1, wherein said priority level of each time-critical traffic frame is defined according to a traffic class to which said time-critical traffic frame pertains.

4. The method according to claim 3, wherein the time-critical traffic frames are, before their transmissions, stacked in FIFO queues depending respectively on the traffic classes to which the time-critical traffic frames pertain, each queue corresponding to one traffic class.

5. The method according to claim 1, wherein the transmission times of the time-critical traffic frames are defined relatively to a current time given by a common clock of the packet-switched network.

6. The method according to claim 1, wherein the time-critical traffic frames are distinguished from non-time-critical traffic frames, said non-time-critical traffic frames being identified as preemptable traffic frames to be transmitted whenever no time-critical traffic frame is to be transmitted, and wherein said next transmission time of a time-critical traffic frame determined in f) defines, relatively to a current time, whether at least one minimum sized fragment of a non-time-critical traffic frame can be transmitted or not.

7. The method according to claim 6, wherein the implementation of the method until f) is launched at least each time when a time-critical traffic frame is transmitted, so as to define the next transmission time of a new time-critical traffic frame.

8. The method according to claim 6, wherein said one minimum sized fragment of a non-time-critical traffic frame corresponds to a duration of a guard-band interval, and
   if the next transmission time is determined in f) to occur after a beginning of said guard-band interval, then any transmission of non-time-critical traffic is deferred,
   and otherwise, at least one fragment of a non-time-critical traffic frame is transmitted.

9. The method according to claim 8, wherein an offset due to command latency is added to a duration of transmission of one minimum sized fragment of a non-time-critical traffic frame in order to determine said duration of the guard-band interval.

10. The method according to claim 8, wherein a transmission command is set to a "hold" status before the beginning of said guard-band interval so as to prevent from any transmission of a non-time-critical traffic frame when said next transmission time of a time-critical traffic frame occurs.

11. The method according to claim 10, wherein said transmission command is set to a "release" status after the beginning of transmission of said time-critical traffic frame.

12. A computer program comprising instructions which, when the program is executed by a processing circuit, cause the processing circuit to carry out the method of claim 1.

13. A computer-readable storage medium comprising instructions which, when executed by a processing circuit, cause the processing circuit to carry out the method of claim 1.

14. An equipment comprising:
   a processing circuit configured to implement the method according to claim 1, and
   a communication interface configured to be connected to the packet-switched network and to be piloted by the processing circuit in view to transmit Ethernet frames, when a transmission of said Ethernet frames is scheduled by the processing circuit.

* * * * *